United States Patent Office 3,178,855
Patented Apr. 20, 1965

3,178,855
BIOLOGICAL PROCESS FOR PROTECTING PLANTS FROM ATMOSPHERIC CONTAMINANTS
Sanford M. Siegel, White Plains, N.Y., assignor to Union Carbide Corporation, a corporation of New York
No Drawing. Filed May 1, 1961, Ser. No. 106,442
9 Claims. (Cl. 47—58)

This invention relates to the treatment of plant life. More particularly, this invention relates to a process for protecting plants against atmospheric damage, and to preparations therefor.

It is well known that the atmosphere contains oxidizing substances, such as ozone, peroxides, nitrogen oxides and the like which adversely affect plant life. However, the degree of atmospheric contamination will vary from area to area. For example, in smog-ridden urban areas such as Los Angeles or Washington, D.C., the percentage of airborne contaminants will be much higher than in rural areas and the damage to plant life will be proportionally greater. The problem, however, can never be said to be completely non-existent in any area.

The oxidizing substances or agents residing in the atmosphere or in solutions in contact with the atmosphere may be termed, for convenience only, as "airborne oxidants," or "oxidizing air pollutants," The harmful effects of heavy concentrations of the "airborne oxidants" or "oxidizing air pollutants" are characterized by eye and respiratory irritations in humans and by adverse effects on certain non-living materials such as, for example, rubber, in which deterioration is often accelerated. Adverse effects on plants are even more pronounced. These are characterized by leaf discoloration and malformation, inhibition of growth, and reduction in crop yields. In extreme cases, such airborne pollution can be lethal to plant life. It should be particularly noted that tobacco plants are particularly susceptible to injury as a result of high zone concentration. The presence of oxidizing air pollutants near ground levels is established by chemical measurements and by the transverse cracking of shaded, looped rubber strips placed in proximity to crop plants in the field.

In addition to the above contaminants, another factor causing harmful effects on plant life is ultraviolet radiation. In this regard, dosages appreciably in excess of approximately $10^5$ ergs/mm.$^2$ are deemed detrimental. Such excess radiation occurs widely as an integrated dosage during the growing seasons of areas such as the central plains of the United States and in semi-arid, desert of semi-arid elevated areas, such as the Colorado Plateau or the irrigated districts of southern California.

It is an object of this invention to provide a process and preparation for treating plants.

It is a particular object of this invention to provide a process and preparation for arresting and substantially counteracting the contamination of vascular plants by airborne oxidants and oxidizing air pollutants.

Other objects will become apparent from the following description and appended claims.

This invention is based upon the discovery that certain anti-oxidant compounds, when employed in an effective amount, will arrest and protect, i.e. substantially counteract the contamination of plants by the aforesaid pollutants. These anti-oxidants may be employed in biological preparations, i.e. in combination with biological carriers, or (less desirably) may be applied directly to the plants. Those anti-oxidants found useful for the practice of this invention, are aralkylamino-, hydrazinic-, indolic-, hydropyridinic-, non-volatile olefinic, and olefinic acidic- (and the salts and esters thereof) anti-oxidants. In this regard, the parent molecules of these groups, i.e. indole, etc. are known to possess, as a basic characteristic thereof, anti-oxidant properties. However, many derivatives of the parent molecules are also anti-oxidants and hence also useful for the practice of this invention. These will be discussed below.

It should be noted that the anti-oxidants are in the general class of reducing agents that is, substances which can act as electron donors. However, they differ from other reducing agents in their ability to arrest the oxidation of an oxidizable substance even though they are present in the substance in minor amounts, i.e. of the order of 1% or less by weight.

Substances which appear to act as anti-oxidants, but which act solely by removing (rendering inactive) metal ions which catalyze oxidations are not antioxidants.

The anti-oxidant property is dependent upon the presence, in the fundamental molecule, of one or more electron donating centers or substituents. Such centers may be localized on atoms with non-bonding electrons or delocalized (in $\phi$-orbital systems), or may consist of a combination thereof. Electron-releasing substituents such as, for example, methyl groups, may enhance (but at any rate will not reduce) the anti-oxidant activity of the parent molecules. Therefore, those derivatives of the parent molecules employable in the process of this invention are those in which the substituents thereof are electron-releasing or donating in nature. Illustrative of electron releasing substituents which will enhance anti-oxidant properties in the parent molecule are straight chain lower-alkyl groups containing from 1 to 8 carbon atoms and hydroxyl and amino groups.

On the other hand, strongly electron-withdrawing substituents have the opposite effect, i.e. they reduce or negate completely the anti-oxidant activity of the parent molecules. Thus, for example, the anti-oxidant activity among the indoles may be reduced to an inoperative level by the introduction of nitro-, carboxylic, aldehydic, or ketonic substituents. Therefore, using the indoles as an example, indole-3-formic acid, indole 3-aldehyde, oxindoles, oxindones and nitroindoles are not antioxidants and hence are inoperative in the practice of this invention. On the other hand, indole itself, and the lower-alkyl, hydroxyl and amino-substituted derivatives thereof, i.e., hydroxylindoles, alkylindoles, and aminoindoles, are anti-oxidants and hence are operative in the practice of this invention.

It is to be noted that some anti-oxidants, such as sodium arsenite, "mercaptans" and the like, are more harmful than helpful to plant life and, hence, are not included among the "protectants" or "arrestants" of this invention.

According to this invention, the aralkylamines useful as antioxidants include those compounds wherein the aryl group is a member selected from the group consisting of phenyl, naphthyl, indolyl, hydroxyindolyl, and alkindolyl derivatives thereof; and wherein the aminoalkyl group is the terminal amino derivative of an alkyl group having between 2 and 10 carbon atoms.

It has been found that the above-indicated members possess the stability to light and chemical stimuli particularly desirable for the purposes of this invention. Moreover, the aminoalkyl groups impart to the aralkylamine anti-oxidants the properties of solubility which also render these compounds suitable for the purposes of this invention.

Illustrative of the aralkylamines useful in the practice of this invention are: β-phenyl-ethylamine, β-phenyl-α-aminopropionic acid, β-(p-hydroxy-phenyl)-α-aminopropionic acid, β-(p-hydroxyphenyl)-ethylamine, β-phenylbutylamine, β-(1,2-dihydroxyphenyl)-ethylamine, α-naphthylethylamine, α-naphthylhexylamine, β-naphthylethylamine, and β-naphthylbutylamine.

Hydrazinic antioxidants useful in the practice of this invention include: hydrazine and the derivatives thereof having the general formulas $RHNNH_2$ and $RCONHNH_2$ wherein R is an aryl or lower alkyl group having from 1 to 5 carbon atoms, i.e. arylhydrazine, alkylhydrazine, alkanecarbohydrazide, and aromaticcarbohydrazide. Illustrative of the derivatives are methylhydrazine, ethylhydrazine, phenylhyrazine, p-bromophenylhydrazine, naphthylhydrazine, salicycloylhydrazine, isonicotinylhydrazine, and benzoylhydrazine.

Indolic antioxidants useful in the practice of this invention include: indole, 3-methylindole, β(β-aminoethyl) indole, 3-(β-aminoethyl)-5-hydroxyindole, 3-indole propionic acid, 3-indole-α-aminopropionic acid, 3-indole butyric acid, and 3-indole caproic acid. Other heterocyclics having a C=C—N group may also be employed in the practice of this invention. These include stable hydropyridines such as reduced diphosphopyridine nucleotide and reduced triphosphopyridine nucleotide.

Non-volatile olefinic antioxidants useful in the practice of this invention include unsaturated compounds of the alkene group which are liquids of low vapor pressure in the temperature interval of between 20 and 40° C. and contain from 12 to 18 carbon atoms. Illustrative of such antioxidants are 1-dodecene, 1-pentadecene, 1-hexadecene, 1-octadecene, and oleylamine.

Olefinic acid, ester and salt antioxidants useful in the practice of this invention include the acids of the general formula $C_nH_{2n-1}COOH$, esters of the general formula $C_nH_{2n-1}COOR$ wherein R is an aryl or lower alkyl group and salts in which one or more radicals of the formula $C_nH_{2n-1}COO=$ are combined with metal ions selected from Group 1 and 2 of the Periodic Table plus stannous, cobaltous, ferrous, and manganous ions. Illustrative of such are oleic acid and the lower esters thereof, such a methyl, ethyl and butyl, the glyceryl ester, triolein and oleates such as sodium, potassium and stannous oleate; and undecylenic acid, and the methyl ester, glyceryl ester, and potassium and stannous salts, thereof.

The phrases "arresting" and "substantially counteracting" are to be understood as including protection against the atmospheric conditions described heretofore and embodied in terms such as "smog," "oxidizing air pollutants", "ultraviolet radiation," and the like. The manifestations of exposure to these atmospheric conditions are indicated by conditions such as wilting, necrosis, and the malformation and discoloration of leaves, stems or derivative organs. They also include the inhibition of seed germination and root growth; the inhibition of seedling growth and development; the inhibition of vegetative and flower buds; and the death of seeds, plants or their parts.

The term "plant" is to be understood as encompassing only the usual manifestations of this term, i.e. vascular plants. In addition, the treatment of the plants will necessarily include the soil media or hydroponic media therefor. The latter are included since the end product of the application will necessarily be the plant. It is to be also understood that the scope of this invention includes treating the whole plant or any part thereof, including leaves, stems, flowers, or fruits.

A wide variety of formulations may be prepared according to this invention. These may incorporate, as the active ingredients thereof, a minor proportion of a member selected from the aforementioned active components, hereinafter referred to for convenience only, as "protectants"; mixtures of two or more of the same, or mixtures of one or more of these compounds with other inert or active systems. The protective preparations can be in the form of solutions, emulsions, suspensions, solids, or solids diluted with solid inert or active biological carriers of the type normally used in agriculture.

Diluents such as water, alcohols, water-alcohol mixtures, hydrocarbons, and substituted hydrocarbons as well as other liquids employed in standard biologically active emulsions and propellants are effective as carriers for the protectants of this invention, when such are employed as solutions, emulsions or the like. Inert solid solvents such as bentonite, limestone, diatomaceous earth, gypsum, fertilizers, peat moss, and other substances of a similar nature are also effective as carriers for the protectants when such are to be used in solid form.

It is to be understood that certain diluents are more desirable for certain protectants and for certain plants than are others. For example, indole is preferably combined with water-alcohol mixtures; and 1-octadecene with aqueous emulsions.

Other carriers particularly desirable for forming the protective preparations of this invention are gas (i.e. oxygen and carbon dioxide)-permeable film-forming polymeric carriers in latex form, i.e. stabilized emulsions. For the practice of the invention, copolymers composed of brittle and low-melting components and individual (homo)polymers which can produce extensible and gas-permeable films are preferred.

The protective compositions of this invention may be applied to the plants in any suitable manner. For example, the process of this invention includes dipping, spraying or dusting the plants, in whole or in part, with the inventive preparations. Alternatively, the protective compositions, when suitably diluted, may be applied to the soil in which the plants are growing or are to be grown. Illustrative of such "suitable dilutions" are the mixture of minor amounts of protectants with peat moss or fertilizer prior to the use of these soil improvement compositions.

For the practice of this invention, the term "effective amount" includes, where water or water-alcohol soluble protectants are employed, solutions thereof as dilute as $10^{-6}$ moles/liter or as concentrated as $10^{-1}$ moles/liter. However, in these compositions concentrations of between $10^{-4}$ and $10^{-2}$ moles/liter are particularly effective. The term also includes emulsions and suspensions as dilute as $10^{-2}$ moles/liter or as concentrated as 0.3 mole/liter. However, in this regard, concentrations in the range of from 0.1 to 1.0 moles/liter are particularly preferred. Finally, it also includes solid applications containing a protectant concentration of approximately $10^{-5}$ moles per plant, although at least ten-fold smaller quantities may be employed as required by the degree of air pollution. In this regard, the class of plant plus other factors such as size and the like will determine the effective amount of protectant.

The protective compositions of this invention can be prepared in any manner consistent with standard practices for preparing biological preparations.

The following examples will further serve to illustrate the practice of this invention:

EXAMPLE I

Quantities of lettuce and turnip seeds were germinated in peroxide solutions of varying strengths. Varying concentrations of indole and hydrazine were added to the solutions. The results of these tests are indicated below in Tables 1 and 2. In the first column of each table, the oxidant peroxide and its concentration are given. In the second column, the concentration of protectant is given. In the third column, the results of 48 hours' germination at 25° C. with the various concentrations of protectant (indole or hydrazine) are given. Germination results are expressed as percentages and are based upon 50 or more seeds per test.

Table I

| Concentration of P-methane-hydroperoxide (moles/l.) | Indole concentration moles/l. | Turnip seed Germination |
|---|---|---|
| 0 | 0 | 79 |
| $2 \times 10^{-5}$ | 0 | 44 |
| $5 \times 10^{-5}$ | 0 | 12 |
| $5 \times 10^{-6}$ | 0 | 0 |
| 0 | $5 \times 10^{-6}$ | 50 |
| $2 \times 10^{-5}$ | $5 \times 10^{-6}$ | 55 |
| $5 \times 10^{-5}$ | $5 \times 10^{-6}$ | 20 |
| $5 \times 10^{-6}$ | $5 \times 10^{-6}$ | 6 |
| 0 | $1 \times 10^{-5}$ | 59 |
| $2 \times 10^{-5}$ | $1 \times 10^{-5}$ | 58 |
| $5 \times 10^{-5}$ | $1 \times 10^{-5}$ | 30 |
| $5 \times 10^{-6}$ | $1 \times 10^{-5}$ | 12 |

Table II

| Concentration of hydrogen Peroxide (M/l.) | Hydrazine concentration (M/l.) | Turnip seed germination |
|---|---|---|
| 0 | 0 | 96 |
| $1 \times 10^{-2}$ | 0 | 60 |
| $2 \times 10^{-2}$ | 0 | 8 |
| 0 | $2 \times 10^{-4}$ | 80 |
| $1 \times 10^{-2}$ | $2 \times 10^{-4}$ | 66 |
| $2 \times 10^{-2}$ | $2 \times 10^{-4}$ | 14 |
| 0 | $1 \times 10^{-3}$ | 60 |
| $1 \times 10^{-2}$ | $1 \times 10^{-3}$ | 82 |
| $2 \times 10^{-2}$ | $1 \times 10^{-3}$ | 36 |

It is apparent from these tables that indole and hydrazine exert protective effects on turnip and lettuce seeds whose germination has been suppressed by peroxides.

EXAMPLE 2

Quantities of cucumber roots were immersed in solutions of buffer salts or in varying solutions containing buffer salts and protectants. These immersed roots were then allowed to mature into ten-day-old seedlings. These young plants were thereupon exposed for 30 minutes to approximately $40$–$100 \times 10^{-6}$ moles/l. of ozone in a sealed chamber. The roots were generally in contact with the protective anti-oxidant compounds for 12 hours prior to ozone treatment and the plants were generally examined for signs of damage 12 hours after ozone treatment. The results of these tests are given in Table III below. In the first two columns the name and concentration of the protectant tested are given. The third column designates the absence (—) or presence (+) of protectant and the final column lists the percentage of test plants damaged. Approximately one-half of the damaged seedlings were dead or dying, the remainder exhibiting tissue collapse, wilting, shrivelling and extensive browning.

Table III

| Protectant | Protectant concentration in moles/liter | Protectant presence | Plants damaged (percent) |
|---|---|---|---|
| 3-indoleacetic acid | $10^{-3}$ | — | 100 |
|  |  | + | 70 |
|  | $5 \times 10^{-3}$ | — | 55 |
|  |  | + | 10 |
|  | $10^{-2}$ | — | 100 |
|  |  | + | 70 |
| Tryptophane | $2.5 \times 10^{-3}$ | — | 55 |
|  |  | + | 10 |
|  | $10^{-2}$ | — | 100 |
|  |  | + | 70 |
| Hydrazine | $10^{-2}$ | — | 100 |
|  |  | + | 65 |
| Reduced diphospho-pyridine nucleotide. | $10^{-4}$ | — | 50 |
|  |  | + | 10 |
| Mescaline | $5 \times 10^{-3}$ | — | 55 |
|  |  | + | 15 |

It is evident from this table that the indicated protectants can protect the entire plant from ozone damage even when the protectant compounds are applied only to the roots of the plants. Protection is shown by the increase in the proportion of undamaged survivors in the test population even after exposure to higher levels of ozone than are known to occur in smogs and similarly polluted air. The protection afforded by contacting the roots of plants with the indicated protectants can be deemed equivalent to the application of the protectants to the soil, other growth media or to hydroponic solutions.

In the following table (Table IV), the results of tests similar to those reported in Table III above are given. The tests differed from the latter in these respects: the entire seedling was immersed in an aqueous protectant solution or emulsion for 5 to 40 hours prior to ozone treatment, and observations were made 12 to 144 hours after treatment. As can be seen below, these variations in procedure had no significantly different effect from that indicated in Table III above.

Table IV

| Protectant | Concentration of protectant (M/l.) | Protectant presence | Plants damaged (percent) |
|---|---|---|---|
| Indole | $3 \times 10^{-4}$ | — | 100 |
|  |  | + | 50 |
| 3-indoleacetic acid | $10^{-3}$ | — | 100 |
|  |  | + | 80 |
| Tryptophane suspension | $10^{-2}$ | — | 100 |
|  |  | + | 70 |
| 1-octadecene emulsion | 0.3 | — | 100 |
|  |  | + | 14 |

It is evident from this table that the indicated anti-oxidants protected the seedlings against ozone damage. The immersion of plants in the protectant solutions can be regarded as equivalent to the effect obtained by spraying plants or plants and soil with the protectant solutions.

EXAMPLE 4

In Table V below the results of tests carried out in the manner similar to that described above in Example 3 are given. The tests differed, however, in these respects: A solution or suspension of protectant or solid protectant was applied to the aerial portion of the test plants either immediately prior or up to 15 hours prior to ozone treatment.

Table V

| Protectant | Protectant concentration and contact time | Protectant presence | Plants damaged (percent) |
|---|---|---|---|
| Indole | $10^{-1}$ moles/l. immediately prior. | — | 100 |
|  |  | + | 86 |
| Tryptophane | 10 mg./plant immediately prior. | — | 100 |
|  |  | + | 40 |
| Indole | $10^{-2}$ moles/l. 15 hours prior. | — | 100 |
|  |  | + | 86 |
| Hydrazine | $5 \times 10^{-2}$ moles/l. 15 hours prior. | — | 100 |
|  |  | + | 79 |

It is evident from this table that the indicated protectants can protect plants against damage when applied in liquid or solid form to the aerial portions of the plant. Even applications made immediately prior to ozone treatment can be highly effective. This mode of treatment is regarded as the equivalent of spray or dust applications.

EXAMPLE 5

A series of tests were conducted to show that the growth-inhibiting effects of oxidants can also be minimized in large part by the application of the protective antioxidant compounds. In these tests, standard segments cut from the hypocotyols of cucumber plants similar to those already described were floated in petri dishes on solutions of buffer salts or buffer solutions containing protectants for 12 hours. Thereafter these segments were exposed in a closed vessel to $100-20\times10^{-6}$ moles/l. of ozone for 30 minutes. After ozone treatment, the elongation of the segments was measured for 12 hours. In Table VI below, the results of these tests are indicated. The data is expressed as percent of growth measured in "control" segments prepared at the same time and handled in the same fashion but not receiving ozone treatment.

*Table VI*

| Protectant | Protectant concentrations | Elongation 12 hrs. after $O_3$ treatment (as percent air control) |
|---|---|---|
| None | $5\times10^{-5}$ moles | 26 |
| 3-indoleacetic acid | $1\times10^{-4}$ moles | 71 |
| Isoniazid | $1\times10^{-4}$ moles | 70 |
| Octadecene-1 | 5% (Vol.) | 71 |

EXAMPLE 6

The protection of growth processes against ozone is not confined to active seedlings, but may also be extended to dormant vegetative (leaf) and flower buds. The tests tabulated in Table VII below were carried out by exposing buds of Forsythia or Euonymus to ozone at $110\times10^{-6}$ moles/l. after they had been immersed in test solutions, as indicated above in Example 5.

*Table VII*

| Plant material | Protectant | Protectant concentration | Inhibition of bud elongation (percent) | Buds killed (percent) |
|---|---|---|---|---|
| Forsythia leaf bud | None | | 25 | |
| | 3-indoleacetic acid | $10^{-3}$ moles/l | 0 | |
| | | $5\times10^{-2}$ | 0 | |
| | 1-octadecene emulsion | 0.15 | 0 | |
| Forsythia flower bud | None | | 37 | 33 |
| | 3-indoleacetic acid | $10^{-3}$ | 18 | 17 |
| | Typtophane suspension | $10^{-3}$ | 21 | 23 |
| | 5-hydroxytryptophane | $10^{-3}$ | 8 | 13 |
| | 1-octadecene emulsion | 0.15 | 0 | |
| Euonymus leaf bud: | | | | |
| Apical bud | None | | 16 | |
| | Stannous oleate emulsion | 0.05 | 4 | |
| Lateral bud | None | | 27 | |
| | Stannous oleate emulsion | 0.05 | 15 | |

The contacting of buds by brief immersion in solutions, suspensions, or emulsions can be regarded as equivalent to spray applications.

It is to be understood that this invention is not only applicable to edible plants but to the non-edible portions thereof and to non-edible ornamental plants, flowers and leaves.

What is claimed is:

1. A process for arresting and substantially counteracting the contamination of vascular plants by atmospheric contaminants which comprises applying to at least a surface portion of said plants an effective amount of at least one active component selected from the group consisting of an aralkylamine, a hydrazine, an indole, a hydropyridine, and an olefin; said aralkylamine having an aryl radical selected from the group consisting of phenyl, naphthyl, indolyl, hydroxyindolyl, and alkindolyl joined to an amino radical through an alkylene radical containing from 2 to 10 carbon atoms; said hydrazine being selected from the grouping consisting of hydrazine, arylhydrazine, alkylhydrazine, alkanecarbohydrazide, and aromaticcarbohydrazide; said indole being selected from the grouping consisting of indole, hydroxyindole, alkylindole, and aminoindole; said hydropyridine being selected from the grouping consisting of reduced diphosphopyridine nucleotide and reduced triphosphopyridine nucleotide and said olefin being selected from the grouping consisting of an alkene containing from 12 to 18 carbon atoms, an unsaturated aliphatic monocarboxylic acid, an unsaturated aliphatic monocarboxylic acid ester represented by the formula $C_nH_{2n-1}COOR$ wherein R is a member of the group consisting of an aryl radical and a lower alkyl radical and an unsaturated aliphatic monocarboxylic acid salt.

2. A process for arresting and substantially counteracting the contamination of vascular plants by atmospheric contaminants which comprises applying to at least a surface portion of said plants an effective amount of at least one active component selected from the group consisting of an aralkylamine, a hydrazine, an indole, a hydropyridine, and an olefin; said aralkylamine having an aryl radical selected from the group consisting of phenyl, naphthyl, indolyl, hydroxyindolyl, and alkindolyl joined to an amine radical through an alkylene radical containing from 2 to 10 carbon atoms; said hydrazine being selected from the grouping consisting of hydrazine, arylhydrazine, alkylhydrazine, alkanecarbohydrazine, and aromaticcarbohydrazide; said indole being selected from the grouping consisting of indole, hydroxyindole, alkylindole, and aminoindole; said hydropyridine being selected from the grouping consisting of reduced diphosphopyridine nucleotide and reduced triphosphopyridine nucleotide; and said olefin being selected from the grouping consisting of an alkene containing from 12 to 18 carbon atoms, an unsaturated aliphatic monocarboxylic acid, an unsaturated aliphatic monocarboxylic acid ester represented by the formula $C_nH_{2n-1}COOR$ wherein R is a member of the group consisting of an aryl radical and a lower alkyl radical and an unsaturated aliphatic monocarboxylic acid salt; said active component being in admixture with a biological carrier.

3. A process according to claim 2, wherein said plants are contacted with a solution containing from $10^{-6}$ moles of active component per liter of carrier to $10^{-1}$ moles of active component per liter of carrier.

4. A process according to claim 3, wherein the active component concentration ranges from $10^{-4}$ to $10^{-2}$ moles per liter of carrier.

5. A process according to claim 2, wherein said plants are contacted with an emulsion containing from $10^{-2}$ moles of active component per liter of carrier to 0.3 mole of active component per liter of carrier.

6. A process according to claim 5, wherein the active component concentration ranges from 0.1 to 1.0 mole per liter of carrier.

7. A process according to claim 2, wherein said plants are contacted with a suspension containing from $10^{-2}$ moles of active component per liter of carrier to 0.3 mole of active component per liter of carrier.

8. A process according to claim 7, wherein the active component concentration ranges from 0.1 to 1.0 mole per liter of carrier.

9. A process according to claim 2, wherein said plants are contacted with a solid application containing $10^{-6}$ to $10^{-5}$ moles of active component per mole of carrier.

References Cited by the Examiner

UNITED STATES PATENTS

| | | | |
|---|---|---|---|
| 2,203,374 | 6/40 | Anderson et al. | 47—6 |
| 2,317,631 | 4/43 | Meyer. | |
| 2,512,044 | 6/50 | Swaney | 71—2.7 |
| 2,805,137 | 9/57 | Clopton. | |
| 2,814,582 | 11/57 | Hackmann. | |
| 2,989,963 | 6/61 | Hoffman. | |

FOREIGN PATENTS

| | | |
|---|---|---|
| 526,892 | 6/31 | Germany. |

OTHER REFERENCES

Muller, Carl: Protecting the Surface of Objects. In Chemical Abstracts, vol. 25, page 4984, 1931, QD1.A51.

Koritz, Helen G., and Went, F. W.: Physiological Action of Smog on Plants, in Chemical Abstracts, vol. 47, Columns 4969i and 4970a, 1953, QD1.A51.

Stowe, B. B., and Thimann, K. V.: The Paper Chromatography of Indole Compounds and Some Indole-Containing Auxins of Plant Tissues, in Archives of Biochemistry and Biophysics, 51(2); pp. 499–516, August 1954, QP 501.A77.

Ek, A., and Witkop, B.: The Synthesis of Labile Hydroxyptophan Metabolites, in Journal of American Chemical Society, 76(22); pp. 5579–5588. Only page 5584 relied upon, Nov. 26, 1954, QD1.A5.

Condensed Chemical Dictionary, Fifth Edition, N.Y., Reinhold, 1956, pages 403, 568, 591, 609, 796, 797, 1007, 1012, 1028, 1125. QD5.C5 (1956).

Lowy, A., and Harrow, B.: An Introduction to Organic Chemistry, N.Y., John Wiley and Sons, 1940, pages 89, 112, 114.

Gerschman, R., et al.: Oxygen Poisoning and X-irradiation: A Mechanism in Common, in Science (Magazine) 119 (3097), pp. 623–626, May 7, 1954. Q1.S34.

California Citrograph 42 (4), p. 137, Vitamin C Found To Protect Plants Against Smog, February 1957, SB 369.A1C2.

Heggestad, H. E., and Middleton, J. T.: Ozone in High Concentrations as Cause of Tobacco Leaf Injury, in Science (Magazine) 129 (3343), pp. 208, 209, Jan. 23, 1959. Q1.S34.

Rich, S., and Taylor, G. S.: Antiozonants To Protect Plants From Ozone Damage, in Science (Magazine) 132 (3420), pp. 150–151, July 15, 1960. Q1.S34.

Siegel, S., Frost, P., and Porto, F.: Effects of Indoleacetic Acid and Other Oxygen Regulators, in Plant Physiology (Magazine) 35 (2), pp. 163–167, March 1960.

T. GRAHAM CRAVER, *Primary Examiner.*

MAURICE A. BRINDISI, A. JOSEPH GOLDBERG,
*Examiners.*